Patented Mar. 17, 1953

2,632,001

UNITED STATES PATENT OFFICE 2,632,001

ANION EXCHANGE RESINS FROM TERTIARY AMINES AND METHYL STYRENE POLYMERS

Elmer L. McMaster, Robert M. Wheaton, and James Russell Skidmore, Midland, Mich., assignors to The Dow Chemical Company, Midland, Mich., a corporation of Delaware No Drawing. Application December 29, 1948, Serial No. 68,064

9 Claims. (Cl. 260—88.1)

This invention concerns certain new anion exchange resins and a method of making the same. It pertains more particularly to the production of water-insoluble anion exchange resins from copolymers of ar-alkyl-monovinyl-aromatic compounds with a polyvinyl-aromatic compound by halogenating the insoluble copolymers and reacting the halogenated polymeric vinyl-aromatic resins with a tertiary amine.

It is known to prepare anion exchange resins from polymers of divinylbenzene and copolymers of divinylbenzene with other polymerizable monovinyl-aromatic compounds, e. g. styrene, vinyl toluene, vinyl naphthalene, etc., by polymerizing divinylbenzene alone or in admixture with a polymerizable monovinyl-aromatic compound, using known procedure, and thereafter nitrating the insoluble polymeric product in granular or finely divided form. The nitrated polymeric product is then reduced to the corresponding amino derivative by treatment with a reducing agent, e. g. nascent hydrogen. The polymeric products thus obtained contain amine groups directly attached to carbon atoms of the aromatic nuclei. Such products are weakly basic anion exchange resins and are useful for removing anions of strong acids from slightly acid aqueous solutions, e. g. in water purification processes.

We have found that more strongly basic anion exchange resins, containing a basic nitrogen atom, e. g. of a quaternary amine group, attached to a carbon atom of an alkyl radical in the polymeric product, can be prepared by halogenating the solid benzene-insoluble copolymers of ar-alkyl-monovinyl-aromatic compounds with a polyvinyl-aromatic compound, e. g. divinylbenzene, and reacting the halogenated polymeric vinyl-aromatic resins with a tertiary amine.

The aminated products are solid resinous quaternary ammonium bases, or salts thereof. All of the products have a basic nitrogen atom of a quaternary ammonium base attached to an alkyl substituent on an aromatic nucleus of the polymer. More specifically, the products have a nitrogen atom of a quaternary amine attached to a methyl substituent on an aromatic nucleus of the polymer, or attached to an alpha carbon atom of an alkyl substituent on an aromatic nucleus of the polymer, when the alkyl substituent contains two or more carbon atoms. The products are all insoluble in water and in dilute aqueous acid of 10 weight per cent concentration and in alkali solution, i. e. 15 per cent aqueous sodium hydroxide. They are also substantially insoluble at room temperature in organic solvents such as benzene, ethylene dichloride, ethanol, acetone, ortho-dichlorobenzene, tetrachloroethylene, beta,beta'-dichlorodiethyl ether, etc.

The aminated products are all useful as anion exchange resins. However, they vary widely in ion exchange capacity and in selectivity toward the absorption of various anions. One such resin may preferentially absorb a certain anion from a solution containing a given mixture of anions, whereas another of the resins preferentially absorbs a different anion from such a solution.

In general, the ion exchange capacity depends upon the proportion of quaternary ammonium groups introduced into the polymeric product. The number of such quaternary ammonium groups is, in turn, dependent upon the number of halo-alkyl radicals in the halogenated resin starting material and upon the completeness with which the halogen atoms of the halo-alkyl radicals are replaced by nitrogen atoms of a tertiary amine. The selectivity for different anions, depends, for the most part, upon the particular tertiary amine employed as reactant in forming the anion exchange resin. The invention permits the production, from a single copolymer, of a series of anion exchange resins having different ion exchange capacities and selectivity for different anions.

The vinyl-aromatic resins subjected to the halogenating reaction are preferably copolymers of divinylbenzene with ar-alkyl-monovinyl-aromatic compounds of the benzene and naphthalene series, i. e. having not more than 10 carbon atoms in the aromatic nucleus, which ar-alkyl-monovinyl-aromatic compounds contain, in addition to the vinyl radical, one or more, preferably from one to three, nuclear substituents consisting of lower alkyl radicals, other than a tertiary alkyl radical, containing not more than four carbon atoms. Examples of such ar-alkyl-monovinyl-aromatic compounds are ar-methylstyrene, ar-dimethylstyrene, ar-trimethylstyrene, ar-ethylstyrene, ar-dimethyl-vinyl-naphthalene, ar-methyl vinylnaphthalene, ar-sec.-butylstyrene, etc.

In a preferred embodiment of the invention the copolymers are prepared from divinylbenzene and ar-alkyl-monovinyl-aromatic compounds which contain, in addition to the vinyl radical, from one to three methyl radicals as nuclear substituents.

The copolymers are solid higher polymeric vinyl-aromatic resins, e. g. having molecular weights of 50,000 or above, and they may contain 50 per cent by weight or less of a polyvinyl-aromatic compound such as divinylbenzene, divinyl toluene, divinyl xylene, divinyl naphthalene, divinyl-ethylbenzene, etc., chemically combined, i. e. interpolymerized, with the ar-alkyl-monovinyl-aromatic compounds just mentioned. The copolymers preferably contain from 0.5 to 40 parts by weight of a polyvinyl-aromatic compound, e. g. divinylbenzene, and from 99.5 to 60 parts of an ar-alkyl-monovinyl-aromatic compound. The copolymers may have inert fillers such as diatomaceous earth, finely shredded asbestos, or powdered glass, etc., incorporated therewith to increase the porosity and effective surface of the same.

The copolymers may be prepared by any suitable method heretofore employed for polymerization of vinyl type monomeric compounds. For instance, a mixture containing divinylbenzene and an ar-alkyl-monovinyl-aromatic compound, e. g. vinyl toluene, may be polymerized in mass or in the presence of a dispersion medium for the monomers by the use of heat, light, or heat and light, in the presence or absence of a polymerization catalyst, at atmospheric, subatmospheric, or superatmospheric pressure.

Suitable catalysts for effecting polymerization of the monomers are the peroxides, e. g. benzoyl peroxide, lauroyl peroxide, hydrogen peroxide, acetylbenzoyl peroxide, etc. Per-compounds such as potassium persulfate, sodium perborate, ammonium persulfate or the like may also be employed as polymerization catalysts.

The polymerization is preferably carried out in aqueous dispersion at temperatures of from 80° C. to 100° C., employing a peroxide, e. g. benzoyl peroxide, as the polymerization catalyst, although other polymerization temperatures and catalysts may be employed. Usually, a protective colloid such as sodium cellulose glycolate, hydroxyethylcellulose, methylcellulose, etc., in amounts corresponding to from 0.01 to 0.5 per cent by weight of the monomers used, is added to the aqueous dispersion to aid in maintaining the monomeric materials dispersed as droplets and to reduce formation of agglomerates or clusters of resin particles, during polymerization of the droplets of monomers to infusible hard granules.

The copolymer is separated from the aqueous dispersion, washed with water and dried, e. g. by heating in a current of hot air, or by other usual methods. The polymeric product may be broken, ground, crushed or otherwise reduced to finer granules or it may be used in the form of beads.

The halogenated derivatives of the copolymers may be prepared by reacting the vinyl-aromatic resins, at temperatures between −10° and 150° C., with chlorine or bromine, in the presence of a halogenation catalyst such as phosphorus, phosphorus trichloride, ultraviolet light or a combination of light and phosphorus trichloride, etc., promoting substitution of halogen for hydrogen attached to carbon atoms of the alkyl radicals on the aromatic nuclei, while the copolymer, in granular form, is dispersed in and swollen by an organic liquid capable of swelling polystyrene such as carbon tetrachloride, benzene, monochlorobenzene, ortho-dichlorobenzene, acetic acid, tetrachloroethylene, etc., which organic liquid is less reactive with the chlorine or bromine than is the copolymer.

The halogenation reaction is preferably carried out at atmospheric pressure or under a slight superatmospheric pressure, e. g. of from 2 to 5 pounds per square inch gauge, at temperatures between 50° and 80° C., employing carbon tetrachloride as the dispersing medium. Halogenation is continued until one halogen atom is substituted for a hydrogen atom in methyl radicals of the polymer and preferably until one halogen atom is substituted for a hydrogen atom in each of such methyl radicals. Such substituent halogen is relatively reactive with tertiary amines as compared to nuclear substituted halogen, or halogen substituted in the polymer chain, and is herein referred to as reactive halogen.

The halogenation reaction to introduce a chlorine or bromine atom into an alkyl radical in the copolymer, is usually accompanied, at least to some extent, by substitution of halogen atoms on aromatic nuclei of the copolymer and also by substitution of halogen atoms in the polymer chain. Substitution of more than one halogen atom on the same methyl radical or substitution of halogen for a hydrogen atom attached to a carbon atom of the polymer chain forms halogenated copolymer derivatives which are not readily reactive with tertiary amines to produce a polymeric product having ion exchange capacity. Chlorine or bromine substituted for hydrogen attached to a carbon atom of an aromatic nucleus is also non-reactive with tertiary amines, although such nuclear substitution of halogen, insofar as we are aware, has no adverse effect on the resin. On the contrary, some nuclear halogenation appears to be an advantage by increasing the density of the polymeric product, which causes more rapid settling of the resin granules on washing and regenerating beds of the same. The heavier resin particles are not as readily swept from a bed of the resin by upflow of liquid, when employed in the usual ion exchange processes.

The granular resin is usually reacted with from 0.5 to 2.0, preferably from 0.5 to 1.5, molecular proportions of chlorine or bromine for each substituent methyl radical in the aromatic nucleus of the structural unit, based on a molecular equivalent weight of the copolymer. No exact proportions can be stated since the proportion of halogen reacted with the copolymer will vary, depending upon the number of methyl radicals attached to an aromatic nucleus in the copolymer, the proportion of halogen reacted with the methyl radicals, and on other factors such as the amount of halogen introduced into the aromatic nucleus or introduced into the polymer chain. Halogenation is continued, in most instances, until the resin forms a product having maximum ion exchange capacity when reacted with a tertiary amine. This can readily be determined by withdrawing a sample of the halogenated resin from the reaction vessel during the course of the halogenating reaction, washing the resin with water, heating the resin with a tertiary amine, e. g. trimethylamine, in aqueous solution at temperatures between 70° and 100° C. for 30 minutes, thereafter converting the aminated resin to the bicarbonate form by washing with an aqueous sodium bicarbonate solution, washing the resin free of bicarbonate solution with water, dispersing a known volume of the resin in an aqueous sodium chloride solution and titrating the solution with N/1 HCl solution to a pH of 4. Halogenation of the resin is stopped when such test shows that it forms a product having a satisfactory ion exchange capacity. For most copolymers the proportion of halogen to be used is within the limits indicated.

The granular halogenated resin is separated from the organic liquid, used as a dispersing medium, by usual methods such as filtering, centrifuging, decanting or the like and washed with water. The resin is preferably washed with a water-soluble organic solvent, e. g. acetone, ethyl alcohol or methanol, to remove residual traces of the dispersing medium and then washed with water.

The halogenated resin is mixed with a tertiary amine and the mixture preferably heated to cause reaction between the tertiary amine and a substituent reactive halogen attached to a carbon atom of a methyl radical, i. e. a halomethyl radical, in the polymeric reactant. Heating of the mixture is continued until at least a portion, preferably each, of the reactive halogen atoms attached to methyl radicals is replaced by a nitrogen atom of a tertiary amine, e. g. to form a quaternary ammonium halide.

The tertiary amine reactants are preferably tertiary alkyl amines, although tertiary amines of the aliphatic, carbocyclic and heterocylic series may be employed. Examples of tertiary amines that may be used in practice of the invention are trimethylamine, triethylamine, diethylmethylamine, tributylamine, tripropylamine, triamylamine, amyldiethylamine, dibutylmethylamine, dimethylethylamine, ethylmethylpropylamine, butylmethylpropylamine, amylbutylethylamine, benzyldimethylamine, dimethylphenylamine, amylbutylethylamine, pyridine, diethylaniline, or mixtures of any two or more of such tertiary amines.

The proportion of tertiary amine employed relative to the halogenated polymer reactant should be such that there is present in the reaction mixture at least one molecular proportion of the tertiary amine for each reactive halogen atom attached to a carbon atom of a methyl radical in the polymeric reactant. The tertiary amine may be used in excess over the minimum proportion just stated. Usually from one to three molecular proportions of the tertiary amine are used per halomethyl radical in the halogenated polymeric ractant employed, although greater amounts may be used.

The quaternizing reaction, i. e. the reaction between the halogenated polymeric vinyl-aromatic resin reactant and the tertiary amine, may be carried out at atmospheric, subatmospheric or superatmospheric pressure and at temperatures between 25° and 150° C., preferably 25° to 100° C., in the presence or absence of a dispersing medium such as water, ethanol, acetone, etc. The reaction may be carried out employing a large excess of the amine, in which case no other dispersing medium need be used. When employing water-soluble tertiary amines that are not readily volatilized at the reaction temperature, the reaction is preferably carried out in an aqueous medium employing the amine in concentration of 20 to 50 per cent by weight or more, based on the combined weight of the same and the water, and the mixture is heated under reflux. The reaction is usually substantially complete in from 2 to 6 hours at the reflux temperature.

It is often desirable to include a catalyst for the quaternizing reaction among which are cupric iodide, potassium bromide, calcium iodide, cuprous chloride, and potassium iodide, but a catalyst is not required.

The quaternized resin is isolated, e. g. by filtering the reaction mixture, and washed with water. The resin may be converted to its basic form by treatment with an aqueous alkali or alkali carbonate solution, e. g. sodium hydroxide, sodium bicarbonate, potassium carbonate, etc.

The anion exchange resins herein described have a number of advantages as compared to the usual anion exchange agents. For instance, they are strongly basic materials and are capable of splitting neutral salts in aqueous medium. They have a high selectivity for removal of anions from fluid media. They are stable to loss of ion exchange capacity, in their bicarbonate form, and may be regenerated an unlimited number of times. In aqueous medium they exhibit anion exchange capacity at a pH range of from 10 to 12. They do not throw color and possess physical stability to splitting and breaking.

The following examples illustrate practice of the invention but are not to be construed as limiting the scope thereof.

*Example 1*

Thirty parts by weight of a benzene-insoluble granular polymer, containing in chemically combined form 90 parts by weight of dimethylstyrene, 6 parts of ethylvinylbenzene and 4 parts of divinylbenzene, was dispersed in 150 parts of carbon tetrachloride and 0.3 part of phosphorus trichloride added thereto as a chlorination catalyst. The mixture was stirred in a glass vessel and chlorine passed through the liquid at a temperature of 56° to 64° C., while exposing the reaction mixture to rays from an ultraviolet lamp placed to one side of the reaction vessel. One hundred grams of chlorine were fed into the reaction vessel over a period of 160 minutes. The granular resin was separated from the liquid by filtering and washed with water. Analysis of a portion of the resin showed it to contain 51.58 per cent by weight chlorine. Nuclear chlorine was 15.68 per cent by weight and side chain chlorine was 35.90 per cent by weight. One part by volume of the granular chlorinated resin thus prepared, and 5 parts by volume of an aqueous 25 per cent by weight trimethylamine solution, were sealed in a pressure bottle and heated at a temperature of 70° C. for 16 hours. After cooling the bottle, the resin was separated by filtering and washed with water to remove unreacted trimethylamine and then washed with an aqueous sodium bicarbonate solution. Analysis of the dry resin indicated that 66.8 per cent of the substituent side chain chlorine was replaced by nitrogen. The aminated resin had an anion exchange capacity equivalent to 27,200 grains of calcium carbonate per cubic foot of resin bed.

*Example 2*

One hundred-sixty grams of a granular copolymer, containing in chemically combined form 90 parts by weight of dimethylstyrene, 6 parts ethylvinylbenzene and 4 parts of divinylbenzene, was dispersed in 500 grams of carbon tetrachloride and 2.0 grams of phosphorus trichloride added thereto as catalyst. The mixture was heated to 70° C., with stirring, and chlorine passed into the reaction vessel below the surface of the liquid at an average rate of 0.6 grams per minute. Chlorination was stopped after 21.5 hours. The resin was separated by filtering the reaction mixture and washed with water. A portion of the resin was dried and analyzed. It contained 49.77 per cent chlorine. Five parts by volume of the washed granular chlorinated resin was added, without drying, to 25 parts by volume of an aqueous 25 per cent by weight trimethylamine solution in a reaction flask and the mixture heated at reflux temperature for 2 hours. The aminated resin was separated from the reaction medium by filtering, washed with water and tested for ion exchange capacity. It had an anion exchange capacity equivalent to 18,250 grains of calcium carbonate per cubic foot of resin bed.

Example 3

A copolymer containing in chemically combined form 95 parts by weight dimethylstyrene, 3 parts ethylvinylbenzene and 2 parts divinylbenzene, was chlorinated by dispersing 62.5 grams of the granular polymer in 300 grams of ortho-dichlorobenzene, adding 0.6 gram of phosphorus trichloride thereto as catalyst and passing chlorine into the mixture while heating the latter, in a glass vessel under exposure to ultraviolet light, at temperatures between 100° C. and 138° C. A total of 188 grams of chlorine was passed into the dispersion over a period of 2.5 hours. The reaction mixture was filtered to separate the resin from the dispersing medium and the chlorinated resin was washed with water. A portion of the chlorinated resin, after drying in an oven at 50° C., was analyzed and found to contain 45.16 per cent by weight chlorine. The nuclear chlorine constituted 18.76 per cent by weight of the chlorinated polymeric product. Five parts by volume of the washed granular chlorinated resin and 25 parts by volume of an aqueous 25 per cent by weight trimethylamine solution, were sealed in a pressure bottle and heated at a temperature of 70° C. for 16 hours. The aminated resin was separated from the reaction mixture by filtering, washed with distilled water and tested for anion exchange capacity. It had an ion exchange capacity equivalent to 22,350 grains of calcium carbonate per cubic foot of resin bed.

Example 4

A copolymer containing in chemically combined form 90 parts by weight dimethylstyrene, 6 parts ethylvinylbenzene and 4 parts divinylbenzene, was chlorinated by dispersing 61 grams of the granular polymeric product in 200 grams of ortho-dichlorobenzene, adding 0.6 gram of phosphorus trichloride thereto and passing chlorine at a rate of one gram per minute into the dispersion at temperatures between 105° and 140° C., under exposure to ultraviolet light for a period of 5 hours. The chlorinated resin was separated from the reaction mixture by filtering and washed with water. A portion of the resin, after drying at room temperature, was analyzed and found to contain 49.69 per cent by weight chlorine. The nuclear chlorine amounted to 11.09 per cent by weight of the chlorinated product. Five parts by volume of the granular chlorinated resin and 25 parts by volume of an aqueous 25 per cent by weight trimethylamine solution, were sealed in a pressure bottle and heated at 70° C. for 16 hours. The aminated resin was separated from the reaction mixture by filtering, washed with water and tested for ion exchange capacity. It had an anion exchange capacity equivalent to 17,450 grains of calcium carbonate per cubic foot of resin bed.

Example 5

To 5 parts by volume of the granular chlorinated resin of Example 4, and 15 parts by volume of tributylamine, there was added 15 parts by volume of ethyl alcohol and the mixture heated in a flask at reflux temperature for 16 hours. The aminated resin was separated by filtering, washed with water and tested for ion exchange capacity. The product had an anion exchange capacity equivalent to 11,150 grains of calcium carbonate per cubic foot of resin bed.

Example 6

To 30 grams of a granular copolymer, containing in chemically combined form 90 parts by weight dimethylstyrene, 6 parts ethylvinylbenzene and 4 parts of divinylbenzene, there was added 150 cc. of carbon tetrachloride and 0.3 gram of phosphorus trichloride as catalyst. The mixture was heated to 60° C. with stirring, in a glass vessel under exposure to ultraviolet light, and 73 grams of liquid bromide added thereto in a dropwise manner, over a period of 2 hours. Heating of the mixture was continued for an additional 3.5 hours. The brominated resin was filtered from the reaction mixture, and washed with water. A portion of the brominated resin was dried in a current of air at room temperature and analyzed. It contained 63.85 per cent by weight bromine. The nuclear bromine constituted 31.60 per cent by weight of the brominated product. Five parts by volume of the brominated granular resin and 25 parts by volume of an aqueous 25 per cent by weight trimethylamine solution, were sealed in a pressure bottle and heated at a temperature of 70° C., for 16 hours. The aminated resin granules were then filtered from the reaction mixture, washed with water and tested for ion exchange capacity. It had an anion exchange capacity equivalent to 14,100 grains of calcium carbonate per cubic foot of resin bed.

Example 7

Sixty-three grams of a granular copolymer, containing in chemically combined form 90 parts by weight methylstyrene, 6 parts ethylvinylbenzene and 4 parts divinylbenzene, was placed in a glass reaction vessel together with 200 cc. of carbon tetrachloride and 0.6 gram of phosphorus trichloride. The mixture was heated at temperatures between 50° and 56° C., under exposure to ultraviolet light and chlorine was fed into the mixture at an average rate of 2.2 grams per minute. The chlorination was continued for 3 hours. The chlorinated resin was filtered from the reaction mixture and washed with water. A portion of the granular resin was dried at room temperature and analyzed. It contained 13.79 per cent by weight nuclear chlorine and 32.55 per cent side chain chlorine. Five parts by volume of the granular chlorinated resin and 25 parts by volume of an aqueous 25 per cent by weight trimethylamine solution, were sealed in a pressure bottle and heated at a temperature of 70° C. for 16 hours. The quaternized resin was separated from the reaction mixture, washed with water and tested for ion exchange capacity. It had an anion exchange capacity equivalent to 17,600 grains of calcium carbonate per cubic foot of resin bed.

Example 8

Sixty-two grams of a granular copolymer containing in chemically combined form 75 parts by weight dimethylstyrene, 15 parts ethylvinylbenzene and 10 parts divinylbenzene, was added to a glass reaction vessel containing 319 grams of carbon tetrachloride and 0.6 gram of phosphorus trichloride as dispersing medium and chlorination catalyst, respectively. The mixture was heated with stirring to a temperature of 70° C. and chlorine fed into the liquid at an average rate of 0.38 gram per minute over a period of 630 minutes while exposing the mixture to rays of an ultraviolet light. The chlorinated resin was filtered from the reaction mixture, and washed with water. A portion of the resin was dried at room temperature and analyzed. The product contained 47.10 per cent by weight chlorine. Side chain chlorine constituted 31.40 per cent, and nuclear chlorine 15.70 per cent of the weight of the resin. Five parts by volume of the washed granular chlorinated resin and 25 parts by volume of an aqueous 25 per cent by weight trimethylamine solution, were sealed in a pressure bottle and heated at a temperature of 70° C. for 16 hours. After cooling the bottle, the aminated resin was separated from the reaction mixture by filtering, washed with water and tested for ion exchange capacity. It had an anion exchange capacity equivalent to 26,500 grains of calcium carbonate per cubic foot of resin bed.

*Example 9*

Sixty-three parts by weight of a granular copolymer, containing in chemically combined form 50 parts by weight dimethylstyrene, 30 parts ethylvinylbenzene and 20 parts by weight divinylbenzene, was dispersed in 319 parts of carbon tetrachloride and chlorinated at temperatures between 68° and 74° C., in the presence of phosphorus trichloride and light as a catalyst, by passing chlorine into the dispersion for 630 minutes at an average rate of 0.7 gram per minute. The reaction mixture was filtered and the resin granules washed with water. Analysis of a portion of the dried resin showed it to contain 29.89 per cent by weight side chain chlorine and 14.10 per cent by weight nuclear chlorine. Five parts by volume of the chlorinated resin and 25 parts by volume of an aqueous 25 per cent by weight trimethylamine solution, were sealed in a pressure bottle and heated at a temperature of 70° C. for 16 hours. The aminated resin was separated from the reaction mixture by filtering, washed with water and tested for ion exchange capacity. It had an anion exchange capacity equivalent to 20,250 grains of calcium carbonate per cubic foot of resin bed.

*Example 10*

Sixty parts by weight of a granular copolymer of 90 parts by weight dimethylstyrene, 6 parts ethylvinylbenzene and 4 parts divinylbenzene were dispersed in 300 parts of carbon tetrachloride and 0.6 part of phosphorus trichloride added thereto as chlorination catalyst. The mixture was stirred and heated in a glass vessel to a temperature of 70°–75° C. Chlorine was fed for one hour at an average rate of 0.6 gram per minute into the dispersion, while exposing the mixture to radiations from an ultraviolet lamp placed at one side of the vessel. The chlorinated resin was filtered from the reaction mixture and washed with water. A portion of the resin was dried at room temperature and analyzed. It contained 18.68 per cent by weight side chain chlorine and 11.35 per cent nuclear chlorine. Five parts by volume of the granular chlorinated resin and 25 parts by volume of an aqueous 25 per cent by weight trimethylamine solution, were sealed in a pressure bottle and heated at a temperature of 70° C. for 16 hours. After cooling the bottle, the aminated resin was separated by filtering, washed with water and tested for ion exchange capacity. It had an anion exchange capacity equivalent to 9450 grains of calcium carbonate per cubic foot of resin bed.

*Example 11*

Fifty-seven parts by weight of a copolymer, containing in chemically combined form, 98.75 parts by weight dimethylstyrene, 0.75 part ethylvinylbenzene and 0.5 part divinylbenzene, was placed in a glass reaction vessel and dispersed in 319 parts of carbon tetrachloride containing 0.6 part of phosphorus trichloride as catalyst. The mixture was heated to a temperature of 60° C., and 487 grams of chlorine passed into the dispersion at an average rate of 0.5 gram per minute, while exposing the mixture to radiations from an ultraviolet lamp placed at one side of the reaction vessel. The chlorinated resin was filtered from the reaction mixture and washed with water. Analysis of the resin showed it to contain 43.50 per cent by weight side chain chlorine and 13.10 per cent nuclear chlorine. Five parts by volume of the chlorinated resin and 25 parts by volume of an aqueous 25 per cent by weight trimethylamine solution were sealed in a pressure bottle and heated at a temperature of 70° C. for 16 hours. After cooling the bottle, the aminated resin was isolated by filtering, washed with water and tested for ion exchange capacity. It had an anion exchange capacity equivalent to 23,400 grains of calcium carbonate per cubic foot of resin bed.

*Example 12*

A copolymer of 90 parts by weight dimethylstyrene, 6 parts ethylvinylbenzene and 4 parts divinylbenzene was chlorinated by procedure similar to that described in Example 1. The chlorinated product contained 10.71 per cent by weight nuclear chlorine and 37.50 per cent side chain chlorine. Three parts by volume of the chlorinated resin, 10 parts by volume of ethyl alcohol and 10 parts by volume of tributylamine, were sealed in a pressure bottle and heated at a temperature of 70° C. for 18 hours. After cooling the bottle, the aminated resin was isolated by filtering, washed with water and tested for ion exchange capacity. It had an anion exchange capacity equivalent to 20,850 grains of calcium carbonate per cubic foot of resin bed.

Other modes of applying the principle of our invention may be employed instead of those explained, change being made as regards the method or products herein disclosed, provided the steps or products stated in any of the following claims or the equivalent of such stated steps or products be employed.

We therefore particularly point out and distinctly claim as our invention:

1. A method of making an anion exchange resin which comprises reacting, at temperatures between 25° and 100° C., a solid halogenated benzene-insoluble copolymer containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 methyl radicals as nuclear substituents, said halogenated copolymer having a reactive halogen atom substituted for a hydrogen atom in at least a portion of the methyl radicals, with a tertiary amine in amount such that at least one molecular proportion of tertiary amine is present in the reaction mixture for each reactive halogen atom attached to carbon of a methyl radical in the polymeric reactant.

2. A method of making an anion exchange resin which comprises reacting at temperatures between 25° and 100° C., a solid chlorinated benzene-insoluble copolymer containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 methyl radicals as nuclear substituents, said chlorinated copolymer having a reactive chlorine atom substituted for a hydrogen atom in at least a portion of the methyl radicals, with a tertiary amine in amount such that at least one molecular proportion of tertiary amine is present in the reaction mixture for each reactive chlorine atom attached to carbon of a methyl radical in the polymeric reactant.

3. A method of making an anion exchange resin which comprises reacting at temperatures between 25° and 100° C., a solid brominated benzene-insoluble copolymer, containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 methyl radicals as nuclear substituents, said brominated copolymer having a reactive bromine atom substituted for a hydrogen atom in at least a portion of the methyl radicals, with a tertiary amine in amount such that at least one molecular proportion of tertiary amine is present in the reaction mixture for each reactive bromine atom attached to carbon of a methyl radical in the polymeric reactant.

4. A method of making an anion exchange resin which comprises reacting at temperatures between 25° and 100° C., a solid chlorinated benzene-insoluble copolymer, containing in chemically combined form from 0.5 to 40 parts by weight divinylbenzene and from 99.5 to 60 parts by weight dimethylstyrene, said chlorinated copolymer having a reactive chlorine atom substituted for a hydrogen atom in at least a portion of the methyl radicals, with a tertiary amine in amount such that at least one molecular proportion of tertiary amine is present in the reaction mixture for each reactive chlorine atom attached to carbon of a methyl radical in the polymeric reactant.

5. A water-insoluble reaction product of a halogenated benzene-insoluble solid copolymer containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 methyl radicals as nuclear substituents, which halogenated copolymer contains substantial nuclear halogenation and has a reactive halogen atom substituted for a hydrogen atom in at least a portion of the methyl radicals, and a tertiary amine in amount such that substantially each reactive substituent halogen atom attached to carbon of a methyl radical in the halogenated copolymer is replaced by a nitrogen atom of the tertiary amine.

6. A water-insoluble reaction product of a chlorinated benzene-insoluble solid copolymer containing in chemically combined form from 0.5 to 40 parts by weight of a polyvinyl-aromatic hydrocarbon and from 99.5 to 60 parts by weight of an ar-alkyl-monovinyl-aromatic hydrocarbon having the vinyl radical and from 1 to 3 methyl radicals as nuclear substituents, which chlorinated copolymer contains substantial nuclear chlorination and has a reactive chlorine atom substituted for a hydrogen atom in at least a portion of the methyl radicals, and a tertiary amine in amount such that substantially each reactive substituent chlorine atom attached to carbon of a methyl radical in the chlorinated copolymer is replaced by a nitrogen atom of the tertiary amine.

7. The reaction product of a chlorinated benzene-insoluble copolymer of from 0.5 to 40 parts by weight divinylbenzene and from 99.5 to 60 parts by weight dimethylstyrene, which chlorinated copolymer contains substantial nuclear chlorination and has a reactive chlorine atom substituted for a hydrogen atom in at least a portion of the methyl radicals, and a tertiary amine in amount such that substantially each reactive substituent halogen atom attached to carbon of a methyl radical in the chlorinated copolymer is replaced by a nitrogen atom of the tertiary amine.

8. The water-insoluble reaction product of a chlorinated benzene-insoluble copolymer of from 0.5 to 40 parts by weight divinylbenzene and from 99.5 to 60 parts by weight of ar-methyl-vinyl-naphthalene having the vinyl radical and from 1 to 3 methyl radicals as nuclear substituents, which chlorinated copolymer contains substantial nuclear chlorination and has a reactive chlorine atom substitued for a hydrogen atom in at least a portion of the methyl radicals, and a tertiary amine in amount such that substantially each reactive substituent chlorine atom attached to carbon of a methyl radical in the chlorinated copolymer is replaced by a nitrogen atom of the tertiary amine.

9. The reaction product of a chlorinated benzene-insoluble copolymer of from 0.5 to 40 parts by weight divinylbenzene and from 99.5 to 60 parts by weight methylstyrene, which chlorinated copolymer contains substantial nuclear chlorination and has a reactive chlorine atom substituted for a hydrogen atom in at least a portion of the methyl radicals, and a tertiary amine in amount such that substantially each reactive substituent chlorine atom attached to carbon of a methyl radical in the chlorinated copolymer is replaced by a nitrogen atom of the tertiary amine.

ELMER L. McMASTER.
ROBERT M. WHEATON.
JAMES RUSSELL SKIDMORE.

REFERENCES CITED

The following references are of record in the file of this patent:

UNITED STATES PATENTS

| Number | Name | Date |
| --- | --- | --- |
| 2,304,637 | Hardy | Dec. 8, 1942 |
| 2,366,008 | D'Alelio | Dec. 26, 1944 |
| 2,409,861 | Hunter | Oct. 22, 1946 |
| 2,591,573 | McBurney | Apr. 1, 1952 |